United States Patent
Fujita (10) Patent No.: US 9,232,608 B2
(45) Date of Patent: Jan. 5, 2016

(54) LIGHT EMITTING DEVICE, DISPLAY DEVICE AND METHOD OF DRIVING LIGHT EMITTING DEVICE

(75) Inventor: Tsukasa Fujita, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 395 days.

(21) Appl. No.: 13/816,003

(22) PCT Filed: Jul. 5, 2011

(86) PCT No.: PCT/JP2011/065344
§ 371 (c)(1),
(2), (4) Date: Mar. 18, 2013

(87) PCT Pub. No.: WO2012/020615
PCT Pub. Date: Feb. 16, 2012

(65) Prior Publication Data
US 2013/0175934 A1 Jul. 11, 2013

(30) Foreign Application Priority Data
Aug. 9, 2010 (JP) .................................. 2010-178533

(51) Int. Cl.
*H05B 37/00* (2006.01)
*H05B 37/02* (2006.01)
(Continued)

(52) U.S. Cl.
CPC .............. *H05B 37/02* (2013.01); *G09G 3/3426* (2013.01); *H05B 33/0815* (2013.01);
(Continued)

(58) Field of Classification Search
CPC ............. G09G 3/3426; H05B 33/0815; H05B 33/0827; H05B 37/00; H05B 37/02
USPC ............ 315/185 R, 186, 192, 193, 291, 294, 315/297, 302, 307, 312
See application file for complete search history.

(56) References Cited

U.S. PATENT DOCUMENTS 7,880,400 B2 * 2/2011 Zhou et al. ..................... 315/247
2004/0208011 A1 10/2004 Horiuchi et al.
(Continued)

FOREIGN PATENT DOCUMENTS

| JP | 2003-332624 A | 11/2003 |
| JP | 2009-141240 A | 6/2009 |
| JP | 2010-056305 A | 3/2010 |

OTHER PUBLICATIONS

International Search Report corresponding to PCT/JP2011/065344, dated Oct. 18, 2011.

*Primary Examiner* — William Hernandez
(74) *Attorney, Agent, or Firm* — Hauptman Ham, LLP (57) ABSTRACT

A light emitting device includes light emission units, a voltage generator, a lighting selector, and a drive control unit. Each light emission unit includes light emitting component groups each of which includes a light emitting component array and a drive switch. The light emitting component array includes light emitting components that are connected in series. The drive switch is connected in series to the light emitting component array to drive the light emitting component array. The lighting selector selects the light emitting component group that is to be lit on according to brightness intensity required for each light emission unit. The drive control unit controls each drive switch independently according to the selection by the lighting selector and controls to light on each light emitting component group independently and controls the voltage generator to generate a common drive voltage.

15 Claims, 4 Drawing Sheets

(51) Int. Cl.
  *G09G 3/34* (2006.01)
  *H05B 33/08* (2006.01)
  *G09G 3/36* (2006.01)
(52) U.S. Cl.
  CPC ......... *H05B 33/0827* (2013.01); *G09G 3/3611* (2013.01); *G09G 2320/0646* (2013.01); *G09G 2330/021* (2013.01); *G09G 2360/16* (2013.01); *Y02B 20/346* (2013.01)

(56) References Cited

U.S. PATENT DOCUMENTS

2009/0015759 A1* 1/2009 Honbo ............................ 349/69
2009/0146932 A1  6/2009 Osaka
2010/0052572 A1  3/2010 Kataoka et al.

* cited by examiner

LIGHT EMITTING DEVICE, DISPLAY DEVICE AND METHOD OF DRIVING LIGHT EMITTING DEVICE

RELATED APPLICATIONS

The present application is a National Phase of International Application Number PCT/JP2011/065344, filed Jul. 5, 2011, and claims priority from Japanese Application Number 2010-178533, filed Aug. 9, 2010.

TECHNICAL FIELD

The present invention relates to a light emitting device, a display device, and a method of driving a light emitting device, and especially relates to a power-saving technology in driving a plurality of light emitting components with an equal drive voltage.

BACKGROUND ART

As a backlight device (a light emitting device) of a display device such as a liquid crystal display device, a backlight device using a CCFL (a cold cathode fluorescent lamp) has been used and also a backlight device including a plurality of light emitting diode (LED) components (hereinafter, referred to as an LED backlight) has been recently used.

However, variations are generally caused in forward voltages applied to the LED component due to product variations in the LED components. In the LED backlight device, a plurality of LED components are connected in series to form an LED component array and a plurality of LED component arrays are connected in parallel. Each of the LED component arrays is driven to be lit on with a common drive voltage. In such driving, variations are caused in the forward voltages Vf of the LED component array due to the product variations in the LED components. Such variations in the forward voltages Vf of the LED component array cause wasteful consumption of driving power. Patent Document 1 describes a technology for preventing such wasteful consumption of driving power. In patent Document 1, drive voltage difference caused by the variation in the forward voltages Vf of each LED component array is detected and the common voltage supplied to the LED component arrays is optimally adjusted and negative-feedback controlled.

[Patent Document 1] Japanese Unexamined Patent Publication No. 2010-56305

Problem to be Solved by the Invention

However, in the technology disclosed in Patent Document 1, if all the LED component arrays are in an off state, the common drive voltage is changed to prevent abnormal increase or decrease in the output voltage that may be caused right after the changing of the common drive voltage. All of the LED component arrays are necessary to be off to achieve power saving of the LED backlight. Patent Document 1 does not disclose that power saving is achieved effectively according to lighting brightness of the LED backlight. In the light emitting device that causes variations in the forward voltage of the display component array, it is desired to provide means for achieving power saving effectively according to the lighting brightness and in which all of the LED component arrays are not necessarily to be off.

DISCLOSURE OF THE PRESENT INVENTION

The present technology was accomplished in view of the above circumstances. It is an object of the present technology to provide a light emitting device that achieves optimal power saving according to lighting brightness and a method of driving such a light emitting device.

Means for Solving the Problem

To solve the above problem, a light emitting device includes light emitting component arrays each of which including a predetermined number of light emitting components that are connected in series, light emitting component groups each of which including the light emitting component array and a drive switch that is connected in series to the light emitting component array and drives the light emitting component array, at least a light emission unit including the light emitting component groups, a voltage generator configured to generate a drive voltage that is applied commonly to each of the plurality of light emitting groups, a voltage detection circuit configured to detect a voltage of a connection point at which the light emitting component array and the drive switch are connected to each other in each of the plurality of light emitting groups, a lighting selector configured to select one of the plurality of light emitting component groups according to brightness intensity that is required for the light emission unit, and a drive control unit configured to control each drive switch independently and control lighting of each light emitting component group independently and control the voltage generator to generate the drive voltage according to selection by the lighting selector.

With this configuration, the light emitting component group that is to be lit on is selected in each light emission unit according to the brightness required for each light emission unit, for example, according to the high brightness mode or the low brightness mode of the light emitting device. For example, in the high brightness mode, all of the light emitting component groups are selected. At this time, the ON-duty ratio of the PWM signal that drives the drive switch is set to be smaller to achieve power saving. In the low brightness mode, one of the light emitting component groups is selected to light on the light emitting components with a predetermined drive voltage to achieve power saving. Thus, power saving is effectively achieved according to the lighting brightness intensity.

The light emission unit may include a pair of light emitting component groups.

With this configuration, the above effects are obtained with the minimum number of light emitting components.

The light emitting component may be a light emitting diode.

With this configuration, power saving is effectively achieved according to the characteristics of the light emitting diode.

Another aspect of the present invention is a display device including the light emitting device, and a display panel using light from the light emitting device to display.

With this configuration, the light emitting device is used as the backlight of the display panel. Accordingly, power saving of the backlight is achieved and power saving is achieved in the display panel.

The display panel may be a liquid crystal display panel using liquid crystal.

With this configuration, power saving is achieved in the liquid crystal display panel.

Advantageous Effect of the Invention

According to the light emitting device and the method of driving the light emitting device of the present invention, power saving is optimally achieved according to lighting brightness.

BEST MODE FOR CARRYING OUT THE INVENTION

Figure 1:
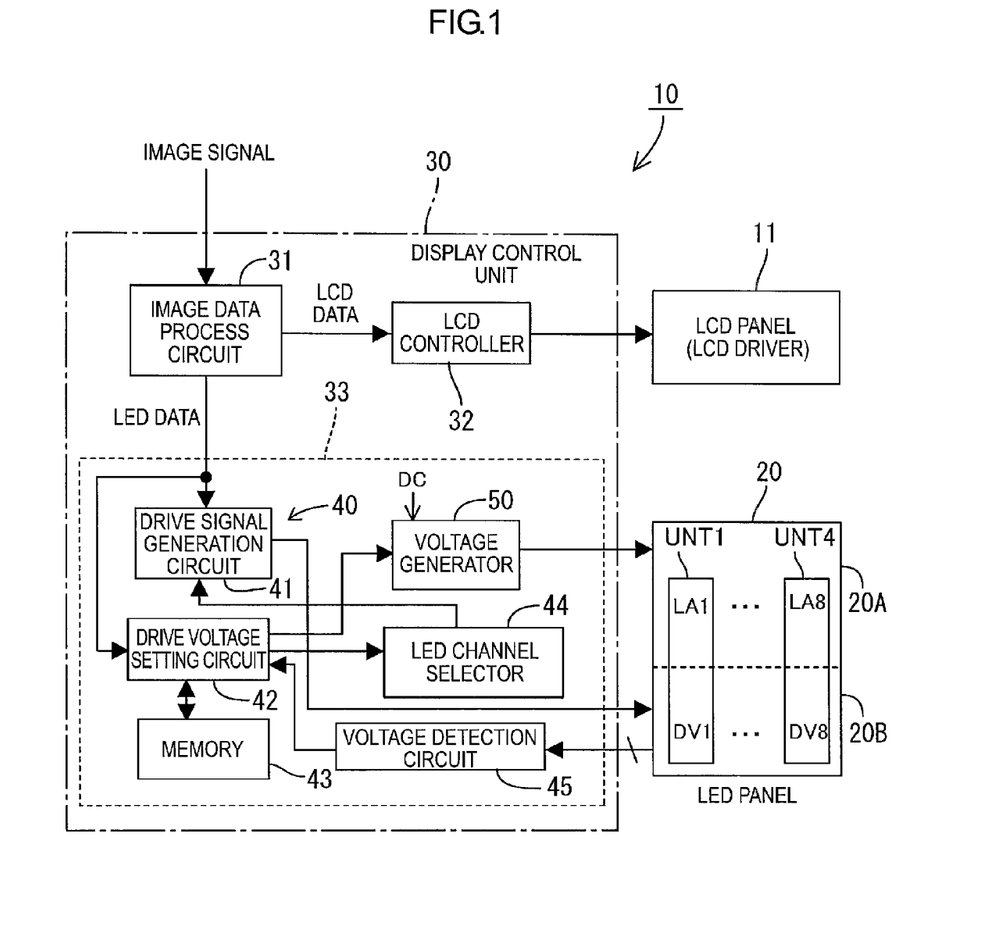
FIG. 1 is a block diagram generally illustrating an electric configuration of a liquid crystal display device according to one embodiment.
Figure 2:
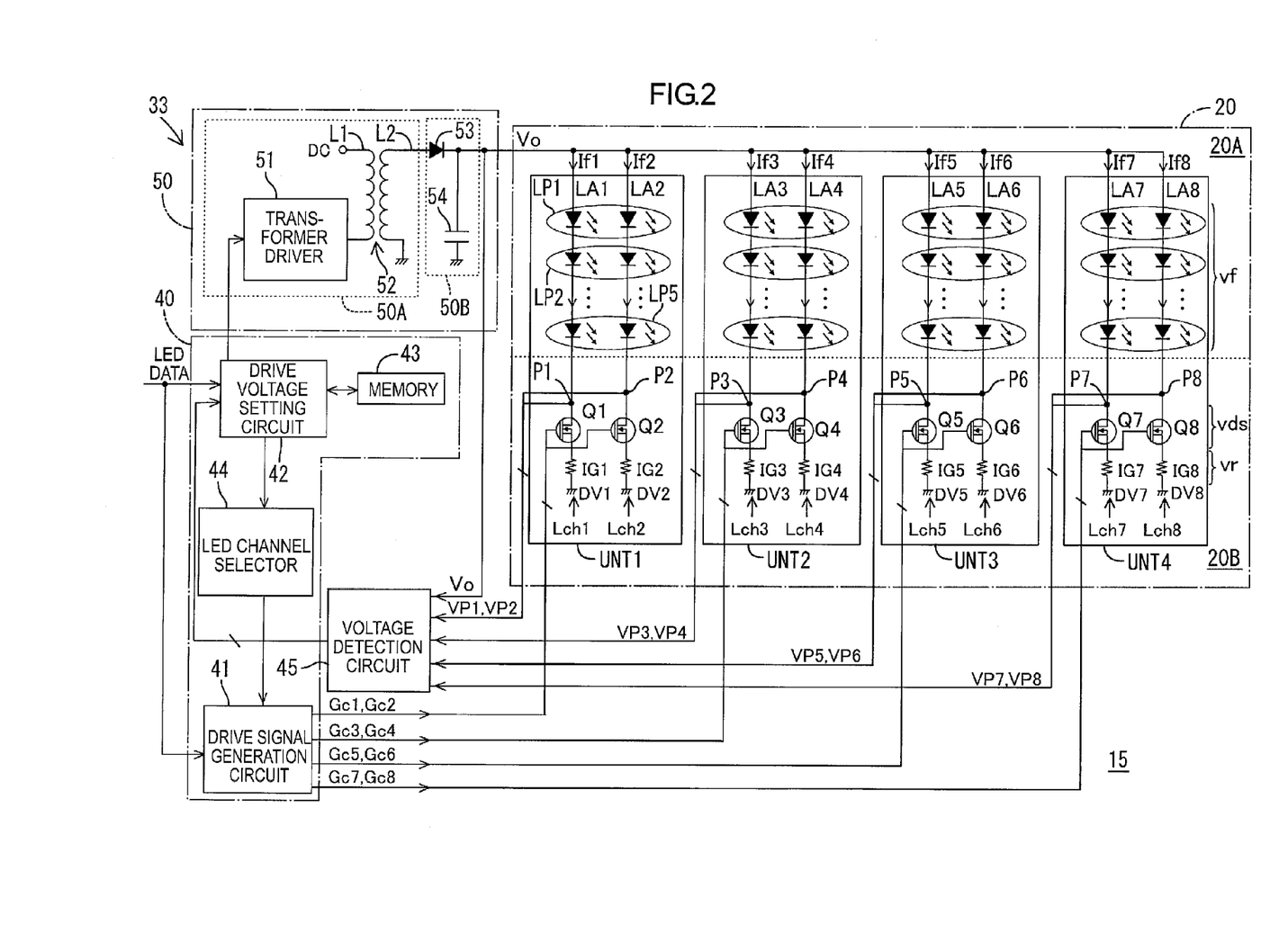
FIG. 2 is a block diagram generally illustrating an electric configuration of an LED backlight included in the liquid crystal display device.

One embodiment of the present invention will be described with reference to FIGS. 1 to 4. In the present embodiment, a liquid crystal display device (one of examples of the display device) including a liquid crystal panel as a display panel is used. FIG. 1 is a block diagram generally illustrating an electric configuration of a liquid crystal display device according to one embodiment. FIG. 2 is a block diagram generally illustrating an electric configuration of an LED backlight 15 (one of examples of the light emitting device) included in the liquid crystal display device.

1. Configuration of Liquid Crystal Display Device

As illustrated in FIG. 1, the liquid crystal display device 10 of the present embodiment includes a liquid crystal panel 11 (one of examples of the display panel), an LED panel 20 and a display control unit 30.

The liquid crystal panel (LCD panel) 11 is formed in a plan view rectangular shape and includes a pair of glass substrates that is bonded together with a predetermined gap therebetween and a liquid crystal is sealed between the glass substrates.

On one of the glass substrates, switching components (for example, TFTs (thin film transistor)) connected to source lines and gate lines that are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates are attached to outer surfaces of the glass substrates.

With such a configuration, the liquid crystal panel 11 includes color pixels of 1920×1080 dots for a high vision panel. The liquid crystal panel 11 further includes an LCD driver and the LCD driver drives the switching component of each pixel. The LED panel 20 includes a light emitting section 20A and a drive section 20B. As illustrated in FIG. 2, the light emitting section 20A includes a plurality of LED arrays (eight light emitting component arrays LA1 to LA8 in the present embodiment) each of which includes a predetermined number of (five in the present embodiment) white diodes (one of examples of the light emitting component, hereinafter referred to as an LED) that are connected in series.

The drive section 20B includes a plurality of (eight in the present embodiment) drive circuits DV1 to DV8 each of which is connected in series to each LED array LA and drives each LED array LA. Each of the drive circuits DV1 to DV8 includes a drive switch Q1-Q8 that is a FET (field-effect transistor) and a current control circuit IG1-IG8 that is a resistance component. The drive switch Q1-Q8 is driven based on PWM (pulse-width modulation). The drive switch Q is not necessarily a FET.

Each of the LED array LA and a corresponding drive circuit DV form an LED channel (a light emitting component group Lch1 to Lch8). A plurality of LED channels are provided and a pair of LED channels forms an LED unit, and four pairs of LED channels (Lch1 and Lch2), (Lch3 and Lch4), (Lch5 and Lch6) and (Lch7 and Lch8) correspond to four LED units UNT1-UNT4.

The LED panel 20 is controlled to be lit on or not for each of the LED channels independently, and the LED panel 20 is controlled to be lit on or not for each LED unit (for example, local dimming). Drive current If1 to If8 flowing in each of the LED channels is generally controlled to be constant by using a current control circuit IG1 to IG8 to obtain predetermined light emission brightness at the time of lighting each of the LED channels.

The LED panel 20 includes at least one LED unit UNT (four in the present embodiment). Each LED unit UNT includes a plurality of LED channels Lch (two in the present embodiment). Each of the LED channels Lch includes one LED array LA and the drive switch Q. The LED array LA includes a predetermined number of LED components (five in the present embodiment) that are connected in series. The drive switch Q is connected in series to the LED array LA and drives the LED array LA.

A pair of LED arrays LA included in each LED unit UNT includes five pairs of LEDs (LP1-LP5) and each of the five pairs includes adjacent two LED components as illustrated in FIG. 2. A pair of LED arrays LA does not necessarily include five pairs of LEDs. For example, each LED array LA includes five independent LED components and two LED arrays LA may be arranged in adjacent to each other.

Each LED unit UNT does not necessarily include two (a pair of) LED channels Lch. For example, each LED unit UNT may includes three or four LED channels Lch.

The display control unit 30 includes an image data process circuit 31, an LCD controller 32 and an LED control unit 33.

The image data process circuit 31 receives an image signal (image data) from a television tuner and determines light emission brightness data (hereinafter referred to as LED data) based on the image signal and transfers the LED data to the LED control unit 33. In the present embodiment, the drive switch Q1 to Q8 of each LED array LA1 to LA8 is controlled to be on or off by a PWM signal.

The image data process circuit 31 generates LCD data based on the image signal and transfers the LCD data to the LCD controller 32. The LCD data is light transmission data of each pixel of the LCD panel 11.

2. Configuration of LED Backlight (Light Emitting Device)

Next, a configuration of an LED backlight 15 (one of examples of the light emitting device) will be explained with reference to FIG. 2. FIG. 2 is a block diagram generally illustrating an electric configuration of the LED backlight 15 of the liquid crystal display device 10.

The LED backlight 15 includes the LED panel 20 and the LED control unit 33 (light emitting component drive circuit).

The LED control unit 33 includes a voltage detection circuit 45, a voltage generator 50, and a drive control unit 40. The LED panel 20 may include only the light emitting section 20A and the LED control unit 33 may include the driving section 20B.

The voltage detection circuit 45 detects a voltage VP1-VP8 of a connection point P1-P8 of each of the LED arrays LA1-LA8 and the corresponding drive switch Q1-Q8 in each of the LED channel Lch1-Lch8. The voltage detection circuit 45 also detects a drive voltage Vo that is applied commonly to the LED channels Lch1-Lch8. The voltage detection circuit 45 converts the detected voltage VP1 to VP8 and the detected drive voltage Vo to a digital signal and transfers the digital signal to the drive control unit 40.

The detected voltage VP detected by the voltage detection circuit 45 is obtained by subtracting the forward voltage Vf of each LED array LA from the drive voltage Vo. The detected voltage VP is equal to a voltage obtained by adding a drop voltage Vr caused by the current control circuit IG1-IG8 to the drop voltage Vds (a voltage between a drain and a source) caused by on resistance of the drive switch Q1-Q8.

$$Vo = Vf + Vds + Vr$$

$$Vp = Vo - Vf = Fds + Vr \quad \text{Formula 1}$$

With a predetermined drive voltage Vo, as the forward voltage Vf of the LED channel Lch increases, the detected voltage VP detected at the connection point P decreases. The drive control unit 40 detects the forward voltage Vf from the drive voltage Vo and the detected voltage VP based on the relationship represented by the formula 1.

The voltage generator 50 includes a booster 50A and a rectifier 50B. The booster 50A includes a transformer driver 51 and a transformer 52. The transformer driver 51 drives a first winding L1 of the transformer 52 to which a DC voltage is supplied and the booster 50A generates a predetermined AC high pressure at a second winding L2. A configuration of the booster 50A is not limited thereto and the booster 50A may be a chopper DC-DC converter without using any transformer. The rectifier 50B includes a rectifying diode 53 and a smoothing condenser 54.

The drive control unit 40 (one of examples of a drive control unit and a lighting selector of the present invention) is configured with an ASIC (IC for an exclusive usage), for example. As illustrated in FIG. 2, the drive control unit 40 includes a drive signal generation circuit 41 (one of examples of the drive control unit), a drive voltage setting circuit 42 (one of examples of the drive control unit), a memory 43, and an LED channel selection circuit 44 (one of examples of the drive control unit and the lighting selector). Each circuit of the drive control unit 40 may be configured independently from each other.

The drive control unit 40 controls each of the drive switches Q1-Q8 to control lighting of each of the LED channels Lch1 to Lch8 independently and the drive control unit 40 controls the voltage generator 50 based on the detected voltage VP1-VP8 that is detected by the voltage detection circuit 45. The drive control unit 40 selects an LED channel Lch in each LED unit UNT and determines the drive voltage Vo according to a lighting mode of the LED backlight 15.

The drive signal generation circuit 41 generates the drive signal Gc1-Gc8 independently based on the LED data from the image data process circuit 31. In the present embodiment, the drive signal Gc1-Gc8 is a PWM signal having a predetermined PWM value (duty ratio) and for example, the PWM signal is generated in synchronism with a frame period. The drive signal Gc1-Gc8 is supplied to a gate of each FET (Q1-Q8) of the LED panel 20. At this time, the drive signal generation circuit 41 controls on and off of each FET (Q1-Q8) independently according to the selection of the LED channel Lch made by the LED channel selection circuit 44.

The drive voltage setting circuit 42 determines the LED channel Lch that is to be driven in each LED unit UNT and determines the drive voltage Vo based on the detected voltage VP1-VP8 when changing a lighting state of each LED channel Lch1-Lch8 based on the LED data from the image data process circuit 31. The drive voltage setting circuit 42 controls the LED channel selection circuit 44 to select the determined LED channel Lch.

For example, when the power of the liquid crystal display device 10 is turned on, the drive voltage setting circuit 42 may control the voltage generation circuit 50 to apply the predetermined drive voltage Vo to each LED channel. The voltage detection circuit 45 may detect the voltage VP1-VP8 of each of the connection points P1-P8. The drive voltage setting circuit 42 may calculate the forward voltage Vf1-Vf8 of each LED channel based on each of the detected voltage VP1-VP8 and the calculated result may be stored in the memory 43. In determining the drive voltage Vo according to the lighting control of each LED channel Lch1-Lch8, the drive voltage setting circuit 42 may use data of the forward voltage Vf1-Vf8 stored in the memory 43 to determine the drive voltage Vo for driving each LED unit UNT.

The memory 43 stores programs related to operations of the drive control unit 40 and detected data. For example, the memory 43 stores data of the detected voltages VP1-VP8, the forward voltages Vf1-Vf8, and drive voltages Vo(1)-Vo(8) corresponding to each LED channel Lch.

The LED channel selection circuit 44 generates a selection signal for selecting each LED channel Lch at a predetermined timing in response to a command from the drive voltage setting circuit 42, and supplies the selection signal to the drive signal generation circuit 41.

3. Lighting Control of LED Backlight According to Lighting Mode

Next, lighting control of the LED backlight 15 having the above configuration in a high brightness mode and in a low brightness mode will be explained with reference to FIGS. 3 and 4.

The LED backlight 15 is operated in one of a high brightness mode and a low brightness mode. The LED backlight 15 is lit on with brightness higher than predetermined reference brightness in the high brightness mode, and the LED backlight 15 is lit on with brightness lower than the brightness of the high brightness mode. The predetermined reference brightness is brightness corresponding to a dimming level "0" (an initial setting value), if 33 levels of the dimming level are set one by one from the level "−16" to the level "+16". In such a case, the levels equal to or greater than "+1" correspond to the high brightness mode and the levels equal to or smaller than "0" correspond to the low brightness mode. The predetermined reference brightness is not limited thereto but may be altered according to the configuration or characteristics of each LED backlight.

3-1. Low Brightness Mode

The low brightness mode will be explained. In the low brightness mode, one of a pair of LED channels Lch included in each LED unit UNT is selected to be driven so as to achieve the brightness required for the low brightness mode. Therefore, in the low brightness mode, the LED channel selection circuit 44 of the drive control unit 40 selects at least one of the pair of LED channels Lch of each of the LED units UNT.

The drive control unit 40 controls an ON-time period during which the drive switch Q of the selected LED channel Lch is on, that is a duty ratio of the PWM signal (PWM dimming) with a predetermined drive current If such that the brightness required for the low brightness mode is achieved by lighting of the selected LED channel Lch. Or the drive control unit 40 controls the drive current If of the selected LED channel Lch (current dimming). The current dimming is executed with using a current control circuit IG to control the drive current If based on a predetermined on-duty ratio.

3-1-1. Selecting LED Channel and Determining Drive Voltage

Operations of selecting the LED channel Lch and determining the drive voltage Vo in the low brightness mode will be explained with reference to FIGS. 3 and 4. FIG. 3 is a flowchart illustrating a process of selecting the LED channel Lch and determining the drive voltage Vo (the common drive voltage) in the low brightness mode. FIG. 4 is a table for explaining selection of the LED channel Lch and determination of the drive voltage V0. The process is executed by the drive control unit 40 according to a predetermined program.

In the process, the drive control unit 40 detects the forward voltage Vf1-Vf8 of each LED channel Lch1-Lch8 (step S10). The predetermined drive voltage Vo is applied to each of the LED channels Lch and the forward voltages Vf1-Vf8 are detected based on the predetermined drive voltage Vo and the detected voltages VP1-VP8 every time the low brightness mode is set. Or the forward voltages Vf1-Vf8 stored in the memory 43 may be used to detect the forward voltage, as described above. Examples of the detected forward voltages Vf1-Vf8 are illustrated in FIG. 4.

Next, the drive control unit 40 determines the LED channel Lch having a minimum forward voltage (one of a pair of LED channels having a smaller forward voltage) in each light emission unit (step S20: first determination). In the example of FIG. 4, the LED channels Lch1, Lch3, Lch5, and Lch 7 are determined to have a minimum forward voltage.

Next, the drive control unit 40 determines which one of the LED units includes the LED channel Lch having a reference forward voltage Vfo that is a maximum forward voltage among the forward voltages Vf of the determined LED channels (step S30: second determination). The LED unit including LED channel having the reference forward voltage Vfo is a reference LED unit. In the example of FIG. 4, the LED channel Lch5 has the reference forward voltage Vfo (16.0V) and therefore, the LED unit UNT3 including the LED channel Lch5 is determined as the reference LED unit.

The drive control unit 40 selects the LED channel having the reference forward voltage Vfo in the reference LED unit (step S40). In the example of FIG. 4, the LED channel Lch 5 is selected in the LED unit UNT3 that is the reference LED unit.

In each of the LED units UNT other than the reference LED unit, the drive control unit 40 selects the LED channel Lch having a forward voltage that is equal to or lower than the reference forward drive voltage Vfo (16.0V) and closest to the reference forward voltage Vfo (step S50: selecting a light emitting component group). In the example of FIG. 4, as described by check boxes, the LED channel Lch2 is selected in the LED unit UNT1, the LED channel Lch3 is selected in the LED unit UNT2, and the LED channel Lch8 is selected in the LED unit UNT4.

Such selection of the LED channel Lch is executed to reduce power loss caused by variation in the forward voltage Vf. For example, if the LED channel Lch having the smaller forward voltage Vf is simply selected among the LED units (UNT1, UNT2, UNT4) other than the reference LED unit UNT3, the LED channel Lch 1 is selected in the LED unit UNT1 and the LED channel Lch7 is selected in the LED unit UNT4. In such a case, as designated by arrows A1 and B1 in FIG. 4, difference between the forward voltage of the LED channel Lch1 and the reference forward voltage Vfo (16.0V) is greater than difference between the forward voltage of the LED channel Lch2 and the reference forward voltage Vfo (16.0V). As designated by arrows A2 and B2 in FIG. 4, difference between the forward voltage of the LED channel Lch7 and the reference forward voltage Vfo (16.0V) is greater than difference between the forward voltage of the LED channel Lch8 and the reference forward voltage Vfo (16.0V). Therefore, according to the method of selecting the LED channel of the present embodiment, the LED channel Lch2 and the LED channel Lch8 having a reference voltage with a smaller difference from the reference forward voltage Vfo (16.0V) are selected in the above cases. This reduces power loss that is caused by variations in the forward voltages Vf in every LED channel Lch.

Next, the drive control unit 40 determines the drive voltage Vo that corresponds to the LED channel Lch having the reference forward voltage Vfo as the common drive voltage Vo (step S60). The drive control unit 40 controls the voltage generator 50 to generate the determined drive voltage Vo. In the example of FIG. 4, the voltage generator 50 generates the drive voltage Vo (5) corresponding to the LED channel Lch5 as the common drive voltage Vo. The drive voltage Vo (5) is applied to each of the selected LED channels Lch2, Lch3, Lch5, Lch8 and PWM dimming or current dimming is executed for each of the LED channels Lch2, Lch3, Lch5, Lch8. At this time, variations in the forward voltage Vf of each LED channel Lch with respect to the drive voltage Vo (5) is reduced in the process of step S50. This reduces power loss that is caused by the variations in the forward voltage Vf of each LED channel Lch.

According to the above-described method of selecting the LED channel Lch and the above-described method of determining the common drive voltage Vo, differences in the forward voltages Vf between the LED channels Lch are reduced and power loss that is caused by the variations in the forward voltages Vf is reduced in the low brightness mode.

3-2. High Brightness Mode

In the high brightness mode, brightness of the LED backlight 15 is more concerned. Both of a pair of the LED channels Lch are lit on so as to obtain target luminous flux (required brightness) and this is based on additivity of luminous flux. In the high brightness mode, the LED channel selection circuit 44 of the drive control unit 40 selects all of the LED channels Lch1 to Lch8.

The drive control unit 40 controls an ON-time period of each drive switch Q1-Q8, that is, a duty ratio of the PWM signal or a drive current If1-If8 of each LED channel such that the brightness required in the high brightness mode is obtained by lighting of each LED channel Lch1-Lch8.

Generally, according to the characteristics of LED components, the luminous flux from the LED component is lowered as the temperature of the LED component increases. Accordingly, if the PWM dimming is executed for the LED backlight 15, or if the PWM control is executed for each drive switch Q1-Q8 with a predetermined drive current If, as the ON-duty ratio of the PWM signal (a duty ratio at which each drive switch is ON) is smaller, the temperature of the LED component is less likely to increase. In executing the PWM dimming, as the ON-duty ratio of the PWM signal is smaller, light emission efficiency of the LED component is improved and power loss of each drive switch Q1-Q8 is reduced. The ON-duty ratio applied to a single LED component (or a single LED channel) may be increased to obtain luminous flux that is target brightness. However, this may deteriorate power efficiency. The ON-duty ratio applied to a pair (a plurality) of LED components (or a pair or a plurality of LED channels) is reduced compared to the ON-duty ratio applied to the single LED component or the LED channel to obtain the target brightness substantially same as the target brightness obtained in the case of the single LED component or the single LED channel. This improves power efficiency.

In the present embodiment, if the PWM dimming is executed for the LED backlight 15 in the high brightness mode, both of the pair of LED channels Lch in each LED unit UNT are used to obtain the target brightness. The ON-duty ratio is set to be smaller than the ON-duty ratio at which the single LED channel Lch is used to obtain the target brightness.

For example, the ON-duty ratio is 50% with a predetermined drive current, if each LED unit UNT is configured with one LED channel Lch including five LED components. In such a case, the ON-duty ratio is 25%, if each LED unit UNT is configured with two (a pair of) LED channels Lch each including five LED components. In such a case, in one cycle of the PWM signal, each of the pair of LED channels Lch may be ON (ON time) simultaneously or may not be ON simultaneously. Preferably, each of the LED channels Lch may not be ON simultaneously.

According to the characteristics of the LED components, if forward current (drive current) If is increased to be or greater than a predetermined value, the light emission efficiency is deteriorated. If the forward current If is increased to be or greater than the predetermined value, the luminous flux (brightness) does not increase in proportion to the forward current If (have no linear relationship). If the current dimming is executed for the LED backlight 15, the forward current If applied to a single LED component (or a single LED channel) may be increased to obtain target luminous flux that is target brightness. However, this may deteriorate power efficiency. The forward current applied to a pair (a plurality) of LED components (or a pair or a plurality of LED channels) is reduced compared to the forward current applied to the single LED component or the single LED channel to obtain the target brightness substantially same as the target brightness obtained in the case of the single LED component or the single LED channel. This improves power efficiency. Accordingly, if the LED component is driven with the forward current If in an area in which the forward current is proportional to the luminous flux (linear area), the light emission efficiency and power saving are improved.

According to the present embodiment, if the current dimming is executed for the LED backlight 15 in the high brightness mode, both of the pair of LED channels Lch in each LED unit UNT are used to obtain the target brightness. In such a case, the forward current If is set to be smaller than the forward current If with which the single LED channel Lch is used to obtain the target brightness. Preferably, the forward current If is set to be a current value in the linear area.

For example, the forward current If is set to be 60 mA/array, if each LED unit UNT is configured with one array of LED channel Lch including five LED components. In such a case, the forward current If is 30 mA/array that is in the linear area, if each LED unit UNT is configured with two arrays of (a pair of) LED channels Lch each including five LED components.

It is preferable that the LED component is driven with the forward current If in the linear area in any other cases than the current dimming in the high brightness mode in view of light emission efficiency and power saving.

In the high brightness mode, the drive control unit 40 controls the voltage generator 50 to generate the drive voltage Vo corresponding to the LED channel Lch having the maximum forward voltage Vf based on the detected voltage Vd detected by the voltage detection circuit 45. The generated drive voltage Vo is the common drive voltage Vo. In the example of FIG. 4, in the high brightness mode, the voltage generator 50 generates the drive voltage Vo (4) corresponding to the LED channel Lch4 as the common drive voltage Vo.

4. Advantageous Effects of the Present Embodiment

In the present embodiment, the LED channel Lch that is to be lit on is selected in each LED unit UNT according to the brightness required for each LED unit UNT, for example, according to the high brightness mode or the low brightness mode of the LED backlight 15.

Therefore, in the high brightness mode, all of the LED channels Lch1 to Lch8 are selected. If the PWM dimming is executed, the ON-duty ratio (ON-time) of the FWM signal that drives each drive switch Q1-Q8 is set to be smaller compared to the configuration in which each LED unit UNT is configured with a single LED channel Lch. This achieves power saving. If the current dimming is executed, the drive current If supplied to each LED channel Lch1-Lch8 is set to be lowered compared to the configuration in which each LED unit UNT is configured with a single LED channel Lch. In the low brightness mode, one LED channel Lch is selected from a pair of light emission component group to be lit on with a predetermined drive voltage V0. This achieves power saving.

According to the present embodiment, power saving is achieved effectively according to the lighting mode of the LED backlight 15 or according to lighting brightness.

Other Embodiments

As described above, the embodiment of the present invention has been described. However, the present invention is not limited to the above embodiment described in the above description and the drawings. The following embodiments are also included in the technical scope of the present invention, for example.

Figure 3:
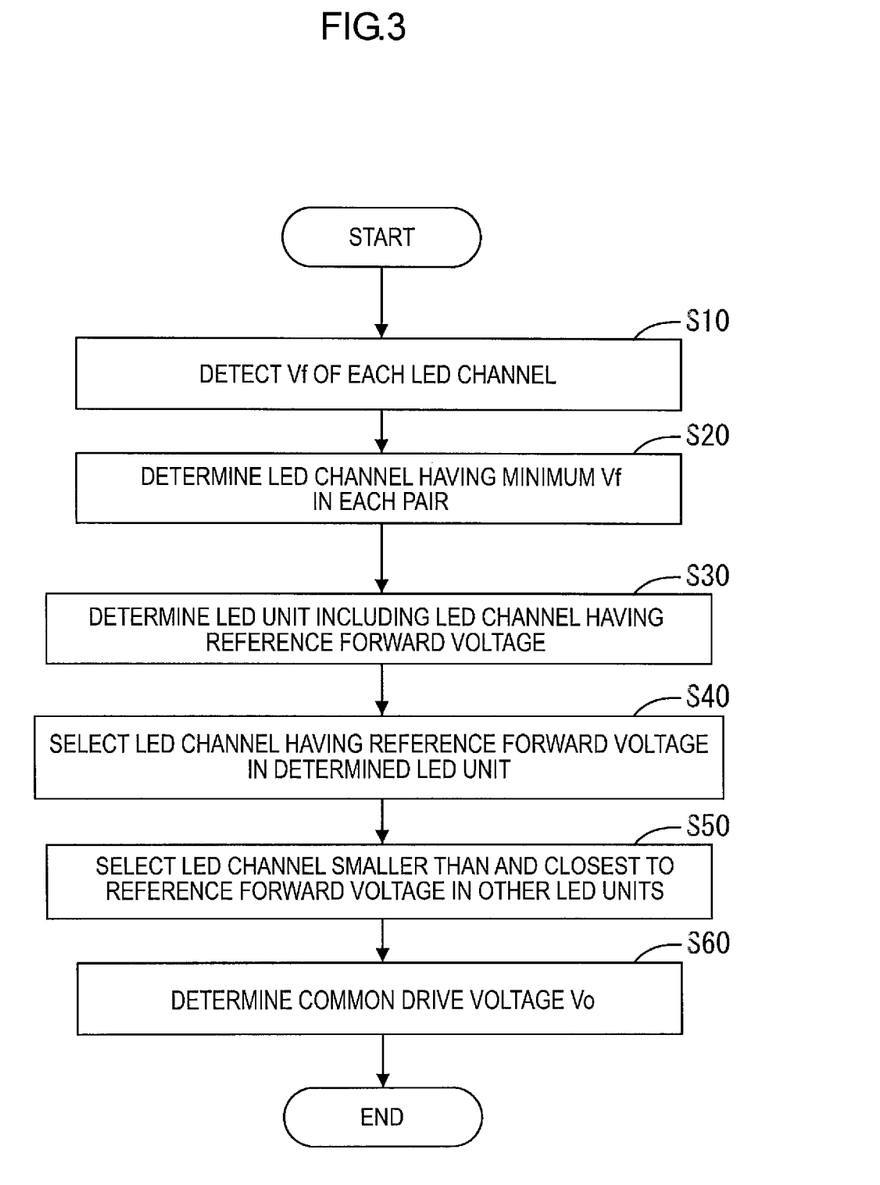
FIG. 3 is a flowchart illustrating processes of selecting an LED channel and determining a drive voltage.

(1) In the above embodiment, in selecting the LED channel Lch in each of the LED units other than the reference LED unit in step S50 in FIG. 3, the LED channel Lch having a smaller forward voltage Vf may be simply selected.

Figure 4:
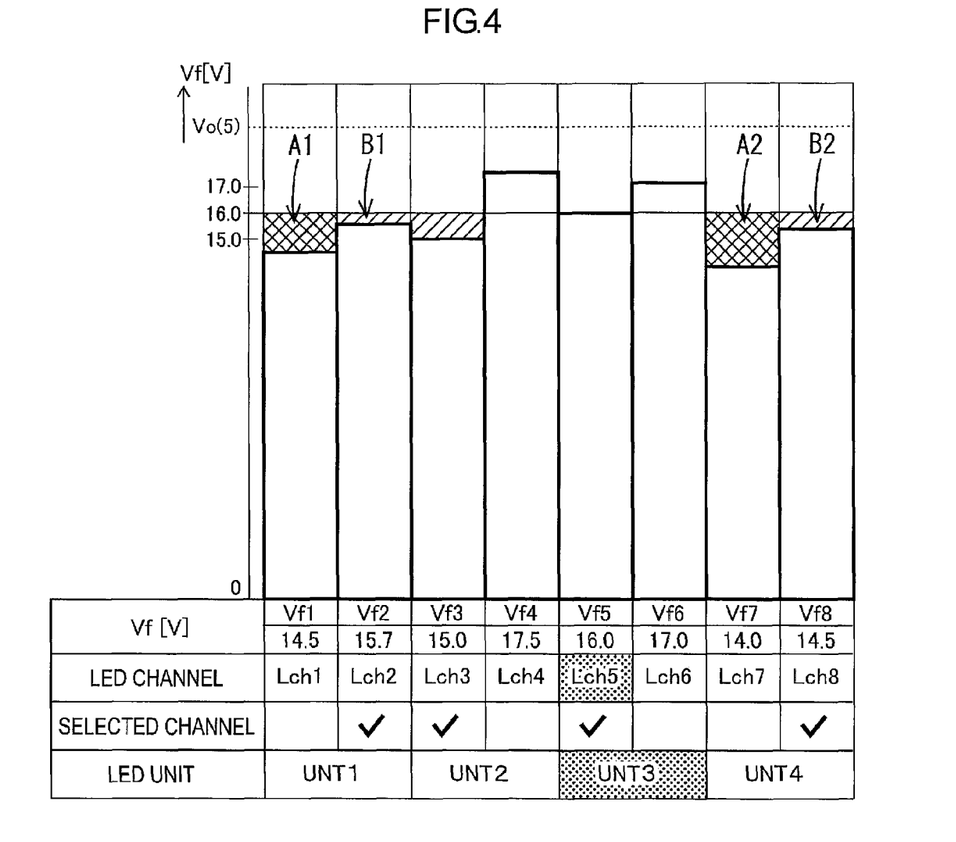
FIG. 4 is a table for explaining LED channel selection and drive voltage determination.

(2) The method of determining the LED channel Lch having the drive voltage Vo that is the reference forward voltage Vf in the low brightness mode is not limited to the method described in FIG. 4. For example, the LED unit UNT including the LED channel Lch having the maximum forward voltage may be selected first, and the LED channel Lch having a smaller forward voltage Vf in the selected LED unit UNT may be selected. Similarly, the LED unit UNT including the LED channel Lch having a next maximum forward voltage Vf may be selected and the LED channel Lch having a smaller forward voltage Vf in the selected LED unit UNT may be selected sequentially. This sequential selection may be repeatedly executed to the last LED unit UNT. In this sequential selection, if the LED channel Lch having a greater forward voltage Vf is selected, the selected LED channel Lch is set to be the LED channel Lch having the reference forward voltage Vf.

(3) In the above embodiment, the light emitting component is an LED and the light emitting device is an LED backlight and the display panel is a liquid display panel. However, this is not limited thereto. For example, the light emitting component may be an LD (laser diode), and the light emitting device may be Aurora Vision (registered trademark) of LED type.

EXPLANATION OF SYMBOLS

10: Liquid crystal display device (Display device)
11: Liquid crystal panel (Display panel)
15: LED backlight (Light emitting device)

20: LED panel
33: LED control unit
40: ASIC (Drive control unit, Lighting selector)
41: Drive signal generation circuit (Drive control unit)
42: Drive voltage setting circuit (Drive control unit)
44: LED channel selection circuit (Lighting selector)
45: Voltage detection circuit
50: Voltage generator
LA1-LA8: LED array (light emitting component array)
Lch1-Lch8: LED channel (Light emitting component group)
Q1-Q8: FET (Drive switch)
UNT1-UNT8: LED unit (Light emission unit)

The invention claimed is:
1. A light emitting device, comprising:
light emitting component arrays including at least a first light emitting component array, a second light emitting component array, a third light emitting component array, and a fourth light emitting component array, and each of the first to fourth light emitting component arrays including a predetermined number of light emitting components that are connected in series;
light emitting component groups including at least a first light emitting component group, a second light emitting component group, a third light emitting component group, and a fourth light emitting component group, wherein
the first light emitting component group includes
the first light emitting component array, and
a first drive switch connected in series to the first light emitting component array at a first connection point and configured to drive the first light emitting component array,
the second light emitting component group includes
the second light emitting component array, and
a second drive switch connected in series to the second light emitting component array at a second connection point and configured to drive the second light emitting component array,
the third light emitting component group includes
the third light emitting component array, and
a third drive switch connected in series to the third light emitting component array at a third connection point and configured to drive the third light emitting component array, and
the fourth light emitting component group includes
the fourth light emitting component array, and
a fourth drive switch connected in series to the fourth light emitting component array at a fourth connection point and configured to drive the fourth light emitting component array;
light emission units including at least a first light emission unit and a second light emission unit, the first light emission unit including the first light emitting component group and the second light emitting component group, and the second light emission unit including the third light emitting component group and the fourth light emitting component group;
a voltage generator configured to generate a common drive voltage applied commonly to the first to fourth light emitting component groups;
a voltage detection circuit configured to detect a first detection voltage of the first connection point, a second detection voltage of the second connection point, a third detection voltage of the third connection point, and a fourth detection voltage of the fourth connection point, and the common drive voltage; and
a drive control unit,
wherein, in a low brightness mode in which the light emitting components are turned on and have a brightness lower than a reference brightness, the drive control unit is configured to:
obtain the common drive voltage, the first detection voltage, the second detection voltage, the third detection voltage, and the fourth detection voltage from the voltage detection circuit,
obtain a first forward voltage of the first light emitting component group by subtracting the first detection voltage from the detected common drive voltage,
obtain a second forward voltage of the second light emitting component group by subtracting the second detection voltage from the detected common drive voltage,
obtain a third forward voltage of the third light emitting component group by subtracting the third detection voltage from the detected common drive voltage,
obtain a fourth forward voltage of the fourth light emitting component group by subtracting the fourth detection voltage from the detected common drive voltage,
compare the first forward voltage and the second forward voltage, and determine a smaller voltage out of the first forward voltage and the second forward voltage as a first determined smaller forward voltage,
compare the third forward voltage and the fourth forward voltage, and determine a smaller voltage out of the third forward voltage and the fourth forward voltage as a second determined smaller forward voltage,
compare the first determined smaller forward voltage and the second determined smaller forward voltage, and determine a greater voltage out of the first determined smaller forward voltage and the second determined smaller forward voltage as a reference forward voltage,
determine one of the first to fourth light emitting component groups that includes the reference forward voltage as a reference light emitting component group,
determine one of the light emission units that does not include the reference light emitting component group as a non-reference light emission unit,
determine which one of the light emitting component groups included in the non-reference light emission unit has the forward voltage that is closest to the reference forward voltage,
determine the light emitting component group having the forward voltage that is closest to the reference forward voltage as a selected light emitting component group,
determine a new common voltage based on the reference forward voltage and the detection voltage corresponding to the reference light emitting component group,
control the voltage generator to generate the new common voltage, and
apply the new common voltage to the reference light emitting component group and the selected light emitting component group.
2. The light emitting device according to claim 1, wherein in a high brightness mode in which the light emitting components are turned on and have brightness higher than the reference a brightness, the drive control unit is configured to:
apply the common drive voltage to all of the light emitting components, and
shorten the ON-time of each of the drive switches.

3. The light emitting device according to claim 1, wherein the light emitting components are light emitting diodes.

4. A display device, comprising:
the light emitting device according to claim 1; and
a display panel using light from the light emitting device to display.

5. The display device according to claim 4, wherein the display panel is a liquid crystal display panel using liquid crystal.

6. The light emitting device according to claim 1, wherein in a high brightness mode in which the light emitting components are turned on and have a brightness higher than the reference brightness, the drive control unit is configured to:
apply the common drive voltage to all of the light emitting components in each of the light emission units, and
reduce the drive current flowing in each of the light emitting component groups.

7. The light emitting device according to claim 1, wherein the drive control unit is further configured to determine the new common voltage by adding the reference forward voltage and the detection voltage corresponding to the reference light emitting component group.

8. The light emitting device according to claim 1, wherein in a high brightness mode in which the light emitting components are turned on and have a brightness higher than the reference brightness, the drive control unit is further configured to:
determine a greatest forward voltage out of the first to fourth forward voltages;
obtain a high brightness mode common drive voltage based on the greatest forward voltage and the detection voltage corresponding to the light emitting component group having the greatest forward voltage;
control the voltage generator to generate the high brightness mode common drive voltage; and
apply the high brightness mode common drive voltage to all of the light emitting component groups.

9. The light emitting device according to claim 8, wherein the drive control unit is further configured to obtain the high brightness mode common drive voltage by adding the greatest forward voltage and the detection voltage corresponding to the light emitting component group having the greatest forward voltage.

10. A method of driving a light emitting device, the light emitting device comprising:
light emitting component arrays including at least a first light emitting component array, a second light emitting component array, a third light emitting component array, and a fourth light emitting component array, and each of the first to fourth light emitting component arrays including a predetermined number of light emitting components that are connected in series;
light emitting component groups including at least a first light emitting component group, a second light emitting component group, a third light emitting component group, and a fourth light emitting component group, wherein
the first light emitting component group includes
the first light emitting component array, and
a first drive switch connected in series to the first light emitting component array at a first connection point and configured to drive the first light emitting component array,
the second light emitting component group includes
the second light emitting component array, and
a second drive switch connected in series to the second light emitting component array at a second connection point and configured to drive the second light emitting component array,
the third light emitting component group includes
the third light emitting component array, and
a third drive switch connected in series to the third light emitting component array at a third connection point and configured to drive the third light emitting component array, and
the fourth light emitting component group includes
the fourth light emitting component array, and
a fourth drive switch connected in series to the fourth light emitting component array at a fourth connection point and configured to drive the fourth light emitting component array; and
light emission units including at least a first light emission unit and a second light emission unit, the first light emission unit including the first light emitting component group and the second light emitting component group, and the second light emission unit including the third light emitting component group and the fourth light emitting component group;

the method comprising, in a low brightness mode in which the light emitting components are turned on and have a brightness lower than a reference brightness,
obtaining a first detection voltage of the first connection point;
obtaining a second detection voltage of the second connection point;
obtaining a third detection voltage of the third connection point;
obtaining a fourth detection voltage of the fourth connection point;
obtaining a common drive voltage applied commonly to the first to fourth light emitting component groups;
obtaining a first forward voltage of the first light emitting component group by subtracting the first detection voltage from the detected common drive voltage;
obtaining a second forward voltage of the second light emitting component group by subtracting the second detection voltage from the detected common drive voltage;
obtaining a third forward voltage of the third light emitting component group by subtracting the third detection voltage from the detected common drive voltage;
obtaining a fourth forward voltage of the fourth light emitting component group by subtracting the fourth detection voltage from the detected common drive voltage;
comparing the first forward voltage and the second forward voltage, and determining a smaller voltage out of the first forward voltage and the second forward voltage as a first determined smaller forward voltage;
comparing the third forward voltage and the fourth forward voltage, and determining a smaller voltage out of the third forward voltage and the fourth forward voltage as a second determined smaller forward voltage;
comparing the first determined smaller forward voltage and the second determined smaller forward voltage, and determining a greater voltage out of the first determined smaller forward voltage and the second determined smaller forward voltage as a reference forward voltage;

determining one of the first to fourth light emitting component groups that includes the reference forward voltage as a reference light emitting component group;

determining one of the light emission units that does not include the reference light emitting component group as a non-reference light emission unit;

determining which one of the light emitting component groups included in the non-reference light emission unit has the forward voltage that is closest to the reference forward voltage;

determining the light emitting component group having the forward voltage that is closest to the reference forward voltage as a selected light emitting component group;

determining a new common voltage based on the reference forward voltage and the detection voltage corresponding to the reference light emitting component group; and applying the new common voltage to the reference light emitting component group and the selected light emitting component group.

11. The method of driving the light emitting device according to claim 10, further comprising:

in a high brightness mode in which the light emitting components are turned on and have a brightness higher than the reference brightness, applying the common drive voltage to all of the light emitting component groups; and shortening the ON-time of each of the drive switches.

12. The method of driving the light emitting device according to claim 10, further comprising:

in a high brightness mode in which the light emitting components are turned on and have a brightness higher than the predetermined reference brightness, applying the common drive voltage to all of the light emitting component groups; and reducing the drive current flowing in each of the light emitting component groups.

13. The method according to claim 10, wherein the new common voltage is determined by adding the reference forward voltage and the detection voltage corresponding to the reference light emitting component group.

14. The method according to claim 10, further comprising:

in a high brightness mode in which the light emitting components are turned on and have a brightness higher than the reference brightness, determining a greatest forward voltage out of the first to the fourth forward voltages;

obtaining a high brightness mode common drive voltage based on the greatest forward voltage and the detection voltage corresponding to the light emitting component group having the greatest forward voltage; and applying the high brightness mode common drive voltage to all of the light emitting component groups.

15. The light emitting device according to claim 14, wherein the high brightness mode common drive voltage is obtained by adding the greatest forward voltage and the detection voltage corresponding to the light emitting component group having the greatest forward voltage.

* * * * *